June 15, 1926.                                                1,589,017
J. C. LINCOLN
METHOD AND MEANS FOR ELECTRIC ARC WELDING
Filed Oct. 11, 1918                    2 Sheets-Sheet 1

Inventor
JOHN C. LINCOLN,
by
Albert           ,
attorney.

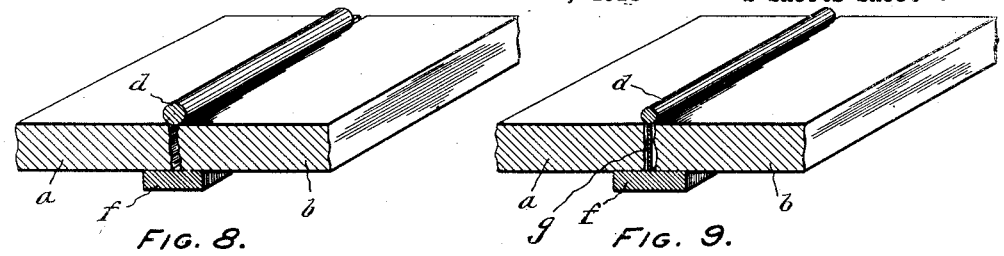
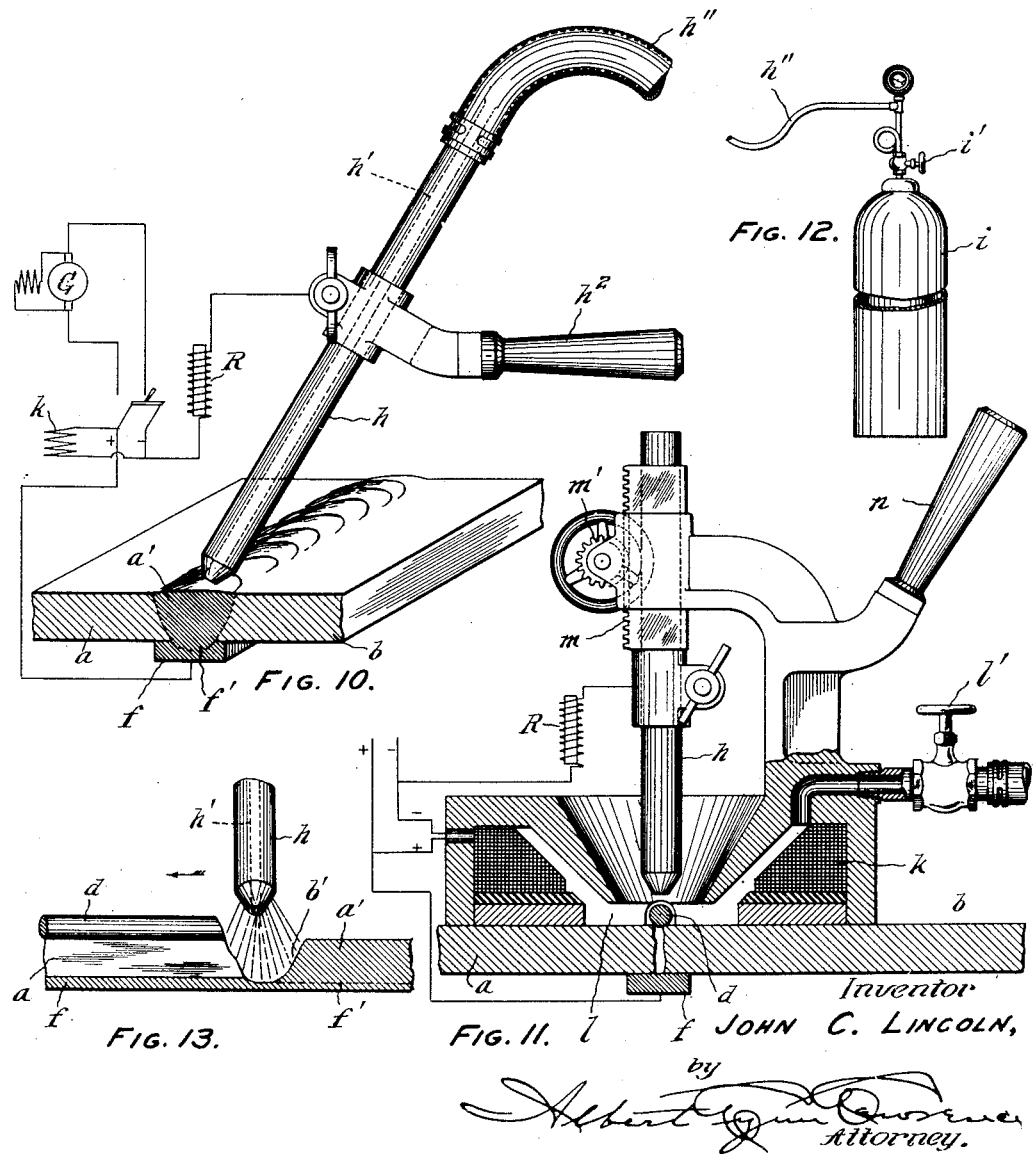

Patented June 15, 1926.

1,589,017

UNITED STATES PATENT OFFICE.

JOHN C. LINCOLN, OF EAST CLEVELAND, OHIO.

METHOD AND MEANS FOR ELECTRIC-ARC WELDING.

Application filed October 11, 1918. Serial No. 257,784.

My invention relates to improvements in methods of welding, and has for its object the production of welds which will be ductile, as strong or stronger than the metal welded, economical in the cost of labor and current, and which preferably avoids the preparation of the materials welded.

Incidentally, my object further contemplates the control of the electric arc by which the welding is accomplished, so that it may be most efficiently directed to the successive points at which the welding operation takes place, and steadied for the production of a strong, ductile and even weld.

It is well known that fairly satisfactory welds can be made upon steel plates by means of the oxy-acetylene flame or the electric arc. The principal objection to the work hitherto produced by either of these means is that the welds are lacking in ductility, while another objection is found in that said welds are not as strong as the metal united.

However, an important item, both as to expense and delay has existed in the necessity for preparing the metal for welding. This preparation of sheet metal ordinarily has consisted in beveling the edges of the sheets of metal to be welded, so that the opposing or substantially abutting surfaces would exhibit an angle approximately of 90°, in order to enable the operative to reach with the arc, the bottom of the space thus afforded for the weld. Accordingly, I have devised a method for welding sheet metal, without any previous preparation of the edges.

During my experiments I have ascertained that in order to obtain ductility in a weld, it is necessary to avoid as far as possible, the oxidizing action of the air, and this I have accomplished by using both an inert gas about the arc, and a protective medium for the weld, which I may term a slag.

The inert gas, such as nitrogen or carbon dioxide, for example, may be supplied to the arc in any suitable manner, as by the use of a hollow carbon through which the gas is constantly supplied during the welding operation, or by means of a separate gas-supplying element positioned adjacent to the arc. The gas supply is such that the atmosphere is excluded from the highly heated metal beneath the arc and oxidation thus is avoided.

In connection with said inert gas, moreover, I may employ a slag covering for the welded seam, or this may be used independently for the purpose of excluding the air from the welded seam during its production. The material forming such slag is melted by the excessive heat of the arc, floats on top of the molten metal and serves as a protection therefor, which in conjunction with the inert gas, serves as an additional protection against oxidation and the result is a weld of such improved quality as to be sufficiently ductile for all practical purposes.

By employing the method or methods above outlined, riveting may be avoided, and much of the work upon steel bridges, steel hulls for vessels, boilers, and the like may be performed with material gain of time and at a very much lower cost than is possible with riveting. In addition, the weld may be made much stronger than the original metal welded, while the riveted joint has a strength at best from 65% to 85% of that of the members thus united.

The welding operation may be conducted with the plates or sheets of metal in substantial abutment in edgewise relation, or said plates of sheet steel may be slightly spaced apart or separated, in which case a bridging strip of sheet steel is positioned beneath the separated edges, subsequently to be welded into the seam thus formed for strengthening and reinforcing it. In either event, it is desirable to supply additional metal, which may be of any suitable alloy, such as nickel steel or manganese steel, for example, to replace certain losses of metal, and to fill the space between the edges of the plates.

In my application for patent, filed September 19th, 1918, Ser. No. 254,773, I have described and claimed more generically, the process herein outlined and particularly the welding of the plates first on one side for slightly more than one-half their thickness and then upon the opposite side to form an intersecting continuous weld. The present application describes the foregoing in connection with certain improvements, and specifically claims in addition, the method of welding with a bridging strip of metal as above set forth.

In welding sheet metal plates in spaced relation, it is essential that the electric arc shall reach the bottom of the space thus formed and fuse into the welded seam, the metal of the bridging strip along the abutting surface thereof. Accordingly, it is very desirable that the arc shall be stabilized and that the inert gas shall be supplied thereto and to the molten metal within said space, for the purpose of producing welds or seams of the necessary ductility. It will be apparent that with the welding conditions indicated, the inert gas should be introduced immediately adjacent to the arc, and this I have accomplished in the simplest manner possible by supplying such gaseous medium through a hollow carbon or electrode. Moreover, if desired, a suitable powdered flux may be introduced with the inert gas supply, although this need not generally be resorted to.

To insure the stabilizing and directing magnetic field for the arc, I may also provide an adjacent solenoid winding mounted to travel with the arc and maintain it within concentric lines of magnetism. It is known that an electric arc in the presence of a magnetic field, tends to be deflected laterally, and the deflection occurs in the direction across magnetic lines of such field. However, by producing the field of force with its magnetic lines parallel to the direction assumed by the electric arc, such field will exert no appreciable deflecting force. This being the case, it is clear that the magnetic lines passing from the material to be welded back into the exciting magnet, will tend to blow out any component of the arc not in line with the common axis of the electrode and magnetic field. It also will tend to make the arc itself more nearly a cylinder than a cone, as is normally the case. With this directive, stabilizing action of the magnetic field, however, there is coupled the liability of blowing out the arc, and preferably the arc-forming circuit is so equipped as to offset this.

Connected in series circuit with the arc, is a suitable inductive resistance so designed that the amount of the ohmic resistance shall be such as to give an arc of approximately thirty-five to forty volts, the amount of self-induction being sufficient to avoid frequent breaking of the arc. It is clear that with the use of inductive resistance, energy will be stored up in the inductance during the instant that the current is increasing from zero to normal, and this energy will be released at the arc in the guise of a momentary increase in voltage before the circuit can be broken. It is possible to design this inductive resistance so that any desired momentary increase of voltage is provided at the arc, necessary to make it substantially stable. For example, with a voltage of fifty-five volts in the external circuit and approximately forty volts across the arc, the loss in the solenoid winding or ohmic portion of the inductive resistance would be fifteen volts. By proper design of the inductive resistance, in a manner well known to those skilled in the art, the welding arc may be made as stable as it would be with a current of from one hundred to one hundred fifty volts provided across a non-inductive resistance.

The method or methods of my invention as herein claimed are accomplished by the negative electrode of an electric arc in conjunction with either or any of the features contributing to the formation of an efficient fabricated seam between plates of steel or other metals or alloys thereof, and by any suitable means. Accordingly, my invention is not limited in its practice to the apparatus which I shall hereinafter describe, nor to the exact details recited in explaining the preferred methods employed. These may best be set forth in connection with the accompanying drawings wherein:—

Figure 6:
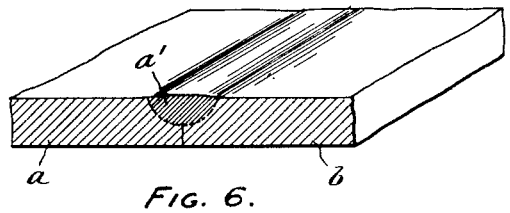
Figure 7:
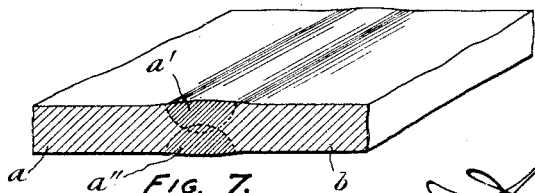

Fig. 6 and Fig. 7 respectively show the initial and secondary welded seams to form intersecting bodies of alloyed metal.

Fig. 8 illustrates the method of seam-welding with the use of a bridging strip and an alloy.

Fig. 9 is a similar view introducing the additional metal in part by the use of an interposed shim.

Fig. 10 is a view partially diagrammatic in character, showing apparatus for effecting the weld with a gaseous inert medium.

Fig. 11 is a similar view illustrating somewhat more elaborate apparatus for producing the magnetic stabilizing field and supplying the inert medium to the arc.

Fig. 12 is a view upon a much smaller scale, partially broken away, illustrating a tank for the compressed gas, and Fig. 13 is another view partially diagrammatic in character and partially in cross-section illustrating the preferred method of forming the welded seam by means of the hollow electrode.

The same character of reference is employed throughout the several figures of the drawings, to indicate similar parts.

Figure 1:
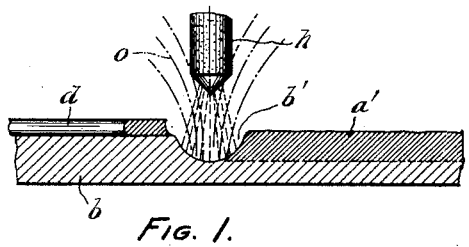
Fig. 1 is a view partially diagrammatic in character, and in cross-section whereby I have indicated the method of arc-welding in its simplest form.
Figure 2:
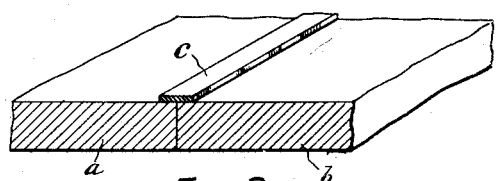
Fig. 2 and Fig. 3 are fragmentary views showing sections of sheet metal plates positioned for seam-welding.
Figure 3:
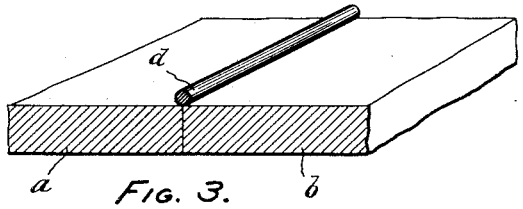
Figure 4:
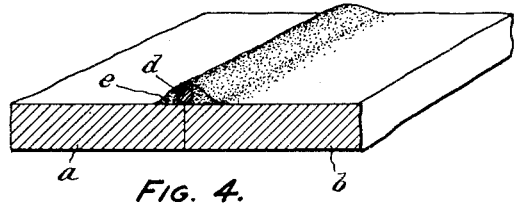
Fig. 4 is a view similar to Fig. 3 illustrating the covering with an inert body of flux.
Figure 5:
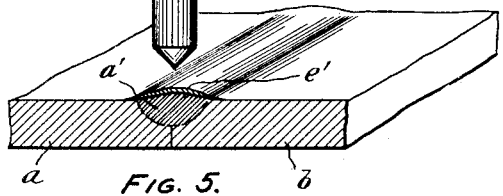
Fig. 5 shows the seam as formed with the covering of flux in Fig. 4.

As indicated respectively in Figs. 1 and 13, the welding operation may initially embrace either a portion of, or the entire thickness of the sheets to be welded, although the latter contemplates complete welding at a single operation, and consequently may be accomplished more rapidly than when the intersecting welds must be formed from opposite faces of the metal.

The sheets $a$ $b$ are positioned with their edges substantially in abutment, as shown in Figs. 2 to 6. A strip $c$ or wire $d$ of steel or alloy, such as nickel-steel or chromium-steel, for example is placed adjacent to the abutting edges, and the flux $e$ is supplied to cover the parts, as in Fig. 4. I may use asbestos, sodium-carbonate, borax or other suitable materials for the flux; the requisite thereof being that it will persist beneath the electric arc in sufficient volume to cover and exclude the air from the molten metal.

In Figs. 8 and 9, the sheets or plates $a$ $b$ are shown slightly separated, with the additional wire $d$ positioned above the interspace and a bridging strip $f$ disposed beneath the same. A shim $g$ may also be interposed, if desired, for supplying additional metal to the welded seam.

The welding is assumed to be accomplished by the negative electrode $h$ which is caused to travel from right to left in Figs. 1 and 13, or away from the observer in Figs. 10 and 11, along the opposing edges of the sheets to be seam welded.

There is shown in Fig. 10 a hollow carbon electrode $h$ having a longitudinal passage $h'$, shown in dotted lines, communicating with the flexible tube $h''$, through which a suitable inert gas may be supplied to the arc, as from a pressure-tank $i$. This may be assumed to be charged with nitrogen or carbon-dioxide, for example. The handle $h^2$ is used by the operative for directing the travel of the arc, which may be observed through a dark glass or welding helmet for shielding the eyes.

Given a sufficient supply of gas, controllable at a suitable valve, such as $i'$, it will be understood that the arc and molten metal constantly are maintained in an inert envelope or atmosphere, which emanates from the active portion of the arc and thus will protect the molten steel or other metal from any oxidizing effect tending to impair the ductility of the welded seam.

The apparatus shown in Fig. 11 is somewhat more elaborate, in that it provides a solenoid $k$ surrounding the electrode, in addition to the peripheral passage $l$ connected with the gas supply valve $l'$, through which the inert gas supply may be directed adjacent to the exterior of the arc. If desired, a pulverulent flux may also be carried to the molten metal by the gas current.

The electrode is shown equipped with a rack and pinion adjustment $m$ $m'$ and the entire device is moved by handle $n$, as the welding operation progresses.

The diagrammatic portions of Figs. 10 and 11 illustrate the generator G which is shown connected through the inductive resistance R with the welding electrode $h$ and also with the solenoid windings $k$, provided for stabilizing the arc.

Preferably, the plates $a$ $b$ need not be specially prepared for welding, but are disposed with their edges in abutment, or in opposition to each other. The arc is then struck, its action is carefully observed and the electrode, which may either be of carbon or metal, is progressively advanced along the seam as rapidly as the welding is accomplished. A weld either slightly in excess of one-half the thickness of the plates or sheets $a'$, as in Figs. 1, 5 and 6, may thus be perfected, or it may proceed the entire thickness thereof, with the use of the backing or bridging strip, as in Figs. 10 and 13; in the latter case the strip becomes a part of the welded seam, since the arc reaches and fuses its exposed section. To complete the weld of Figs. 5 and 6, the arc is progressively applied to the opposite sides of the sheets to produce an intersecting weld $a''$ shown in Fig. 7. Any losses of metal or added metal will be supplied by the wire or strip of steel or alloy which will contribute to the body and characteristics of the welded seam thus produced.

In Fig. 1 I have endeavored somewhat diagrammatically to show the action of the welding arc in forming the partial seam of Fig. 6 in accordance with my invention. The electrode $h$ is pictured as drawn from the steel $b$, and in the process of welding, there results a marked depression $b'$, which presumably is due to the boiling out of the molten metal under the heat of the electric arc. The progress of the arc is assumed to be from right to left and the metal is melted from the left side of the depression and from the wire $d$ under the intense action of the arc, and actually transferred to the right side thereof, where it solidifies. A somewhat violent agitation of the molten metal takes place beneath the arc, so that with the addition of any alloying material, a fairly uniform ductile seam results.

I have endeavored to indicate by the dotted lines $o$ in Fig. 1, the magnetic lines of force wherein the arc is concentrically enclosed during the excitation of the windings $k$. These serve to converge somewhat or render more truly cylindrical, the normally frusto-conical shape of the arc, and by their concentric directive effect, materially stabilize the welding action of the electric arc, while the continuity of such arc is contributed to by the inductance R; all as previously explained.

It should be understood that the arc-welding described is fabricated beneath a suitable inert medium, either solid or gaseous or both in conjunction. Thus in Fig. 4, the flux $e$ is shown in position for arc-welding, while in Fig. 5, the partial seam weld $a'$ has been formed by the electrode $h$ and a crust $e'$ still remains from the excess of fluxing inert material employed.

The gaseous inert medium, of course, is supplied to the arc, either interiorly or exteriorly thereof, during the fabrication of the seam, and in sufficient volume to exclude the air from the molten metal and insure a ductile weld. The gas is better adapted to penetrating the interspaces between the sheets, as in Figs. 8, 9 and 11 for the purpose of protecting the molten steel, and a weld $f'$ as shown in Fig. 10, extending into the body of the bridging strip $f$ and incorporating the additional or alloying material, may be fabricated completely during the passage of the electric arc, while fully protected by the inert gaseous medium. Thus, the seam-welding may proceed more rapidly than with the method described in my prior application and shown in Figs. 5, 6 and 7. However, both methods for fabricating seam-welds, repairs or the like, have their advantages. Thus the latter method, although requiring two operations, produces intersecting welds normally of greater thickness than does the method herein specifically claimed.

Fig. 13 illustrates the procedure for welding with a backing or bridging strip completely through the thickness of the sheets, employing therefor a hollow carbon directing its inert medium within the depression $b'$, centrally of the arc. The arc is shown of somewhat greater spread than that of Fig. 1, for the reason that the stabilizing magnetic field is assumed to be absent. It is also apparent that a larger body of metal or wire $d$ is required for filling the interspace between the plates or sheets of steel, as shown in Figs. 8, 9 and 11.

These welding operations take place under ideal conditions for producing a ductile weld, by maintaining the molten metal within or beneath a protecting inert covering, either gaseous or solid, or both combined. Ordinarily, however, the inert gas is sufficient for protecting the weld from oxidation or other deleterious action, and this medium possesses the advantage of leaving no crust or particles, while being more readily controlled and directed during the welding operations.

Having now described the preferred modes and means for practicing my invention, I claim and desire to secure by Letters Patent, the following:—

1. The method of arc-welding, which consists in surrounding the molten metal with an inert medium during the welding operations, substantially as set forth.

2. The method of arc-welding, which consists in supplying an inert gaseous medium to the arc and the arcing surface of the welded metal interiorly of said arc, substantially as set forth.

3. The method of arc-welding, which consists in advancing the arc sprung from a non-metallic electrode along the metal to be welded and maintaining the molten metal under a slag covering, substantially as set forth.

4. The method of arc-welding, which consists in supplying to the arc and the welded metal a volume of inert gas, sufficient to exclude the air in open arc welding operations, substantially as set forth.

5. The method of arc-welding, which consists in advancing the welding arc and a member supplying an inert gaseous medium concurrently along the seam undergoing the welding operations, substantially as set forth.

6. The method of arc-welding, which consists in applying a slag covering to the seam undergoing the welding operation and directing a supply of an inert gaseous medium as an envelope for the molten metal during the action of the arc, substantially as set forth.

7. The method of arc-welding, which consists in supplying an inert gaseous medium at the apex of the welding arc, substantially as set forth.

8. The method of arc-welding which consists in opposing the unprepared edges of the sheets to be united in spaced relation, supplying a body of welding metal, directing an arc along the opposing edges, and maintaining a supply of inert gas adjacent to the effective portion of the arc, substantially as set forth.

9. The method of arc-welding which consists in opposing the unprepared edges of the sheets to be united in spaced relation, with a bridging strip of metal positioned along one side thereof, supplying a body of welding metal and directing an arc along the opposing edges to produce a seam, substantially as set forth.

10. The method of arc-welding which consists in opposing the unprepared edges of the material to be united in spaced relation, directing an arc along said edges, supplying an inert gaseous medium adjacent to the effective portion of the arc, and melting additional welding metal directly to the opposing edges of the welded material to form a ductile seam therebetween, substantially as set forth.

11. The method of arc-welding which consists in opposing the unprepared edges of the metal, directing an arc along said edges and supplying an inert gas interiorly of the arc during the welding operation, substantially as set forth.

12. The method of arc-welding which consists in opposing the unprepared edges of the material to be united, supplying additional welding material thereto, directing an arc along said edges and material to produce a welded ductile seam, and meantime maintaining a supply of inert gas interiorly of the arc, substantially as set forth.

13. The method of seam welding with an uncoated non-metallic electrode, which consists of maintaining the molten metal producing the welded seam beneath a slag covering during the welding operation, substantially as set forth.

14. The method of seam welding with an uncoated non-metallic electrode, which consists in supplying a body of metal to the seam to be welded and maintaining the molten metal producing the welded seam beneath a slag covering during the welding operation, substantially as set forth.

15. The method of welding, which consists in enveloping the heating flame in an inert medium and maintaining the molten metal producing the welded seam beneath an inert gas and a slag covering during the welding operation, substantially as set forth.

16. The method of welding, which consists in opposing unprepared edges of the sheets to be united, supplying an independent body of metal thereto, providing a slag covering for said opposing edges, and causing a heating flame to travel along said edges, substantially as set forth.

17. The method of arc-welding which consists in placing the sheets to be welded in opposition, but separated from each other, positioning a metal bridging strip beneath the separated edges of said sheets, directing a welding arc within the space separating said edges and welding them to the bridging strip by advancing the arc as the metal is fused, substantially as set forth.

18. The method of arc-welding which consists in placing sheet steel plates with their edges slightly separated, positioning a bridging strip beneath said edges, directing a traveling electric arc within said space, and supplying additional metal to the seam thus formed, sufficient approximately to fill the space between the welded plates, substantially as set forth.

19. The method of arc-welding which consists in positioning the members to be united with their edges spaced apart, bridging said space by a bottom strip of metal, striking the electric arc within said space, welding the edges and strip into a common seam, maintaining a supply of inert gas at the active portion of the arc, and causing the travel of the arc and gas supply along the edges as the welding operation progresses, substantially as set forth.

20. The method of arc-welding which consists in positioning the members to be welded with their edges spaced apart, bridging said space by a metal strip, striking the electric arc within said space, supplying additional metal to the arc sufficient approximately to fill said space, and causing the travel of the arc along the separated edges, whereby the members, the bridging strip and the added metal are fused into a reinforced seam, substantially as set forth.

21. The method of arc-welding which consists in positioning sheet steel plates in narrowly spaced relation with a bridging strip beneath said space, causing the travel of the electric arc along the edges of said plates, meantime stabilizing said arc by a magnetic field, and supplying to the seam as thus formed, additional metal sufficient approximately to fill the space between said plates, whereby a reinforced seam is formed, substantially as set forth.

22. The method of arc-welding, which consists in disposing the sheets of metal to be united with their edges in opposition, directing an electric arc progressively along said edges, and supplying to the seam thus produced a pre-positioned alloying member capable of imparting the desired characteristics to the completed seam, substantially as set forth.

23. The method of arc-welding, which consists in positioning plates of sheet steel with their edges in opposition, directing an electric arc along said edges to produce a fusion between said plates, supplying a pre-positioned alloying member of different tensile strength to the seam thus produced, and protecting the metal while in molten condition by an inert medium, substantially as set forth.

24. The method of uniting sheet steel plates, consisting in placing their edges in opposition, causing the travel of an electric arc along said edges, pre-positioning an alloying member of definite characteristics and size, supplying to the seam in molten form as the same is fabricated, an alloy such as manganese steel sufficient to complete a seam approximating the cross-section of the plates united, and protecting the metal while in molten condition by an inert medium, substantially as set forth.

25. The method of arc welding which consists in disposing the members to be welded in opposition to each other, positioning a welding member for augmenting the seam substantially in the location thereof, covering the same with sodium carbonate, and directing the electric arc along said member and the members to be welded, to produce a seam, substantially as set forth.

26. The method of arc welding which consists in disposing the members in welding position, placing a seam-forming member substantially in the location of the desired seam, covering the same with sodium carbonate, and directing the travel of an electric arc along the location of the seam progressively as the metal and slag are fused, substantially as set forth.

27. The method of arc welding which consists in disposing the members in welding position, placing a supply of sodium carbonate along the line of the proposed seam, and directing an electric arc progressively against said members to effect fusion of the metal and its slag covering substantially as set forth.

28. The method of arc welding which consists in disposing the members to be united in welding position, placing a charge of sodium carbonate along the line of the intended seam and directing an electric arc along the same, meantime supplying to the completed seam progressively, sufficient additional molten metal beneath the slag covering in fusion with the said members, substantially as set forth.

29. Means for forming an arc weld, comprising an electrode, means for supplying an inert gas to its arc, and an energizing electric circuit connected with said electrode, substantially as set forth.

In testimony whereof I do hereto affix my signature.

JOHN C. LINCOLN.